JACK E. BRIDGES
*INVENTOR.*

BY *Francis W. Crotty*
*HIS ATTORNEY*

Jan. 24, 1956 J. E. BRIDGES 2,732,495
AUTOMATIC FREQUENCY-CONTROL CIRCUIT
Filed Sept. 27, 1950
2 Sheets-Sheet 2

JACK E. BRIDGES
INVENTOR.
BY Francis W. Crotty
HIS ATTORNEY

United States Patent Office 2,732,495

Patented Jan. 24, 1956

2,732,495

AUTOMATIC FREQUENCY-CONTROL CIRCUIT

Jack E. Bridges, Cicero, Ill., assignor to Zenith Radio Corporation, a corporation of Illinois Application September 27, 1950, Serial No. 187,120

6 Claims. (Cl. 250—36)

Figure 1:
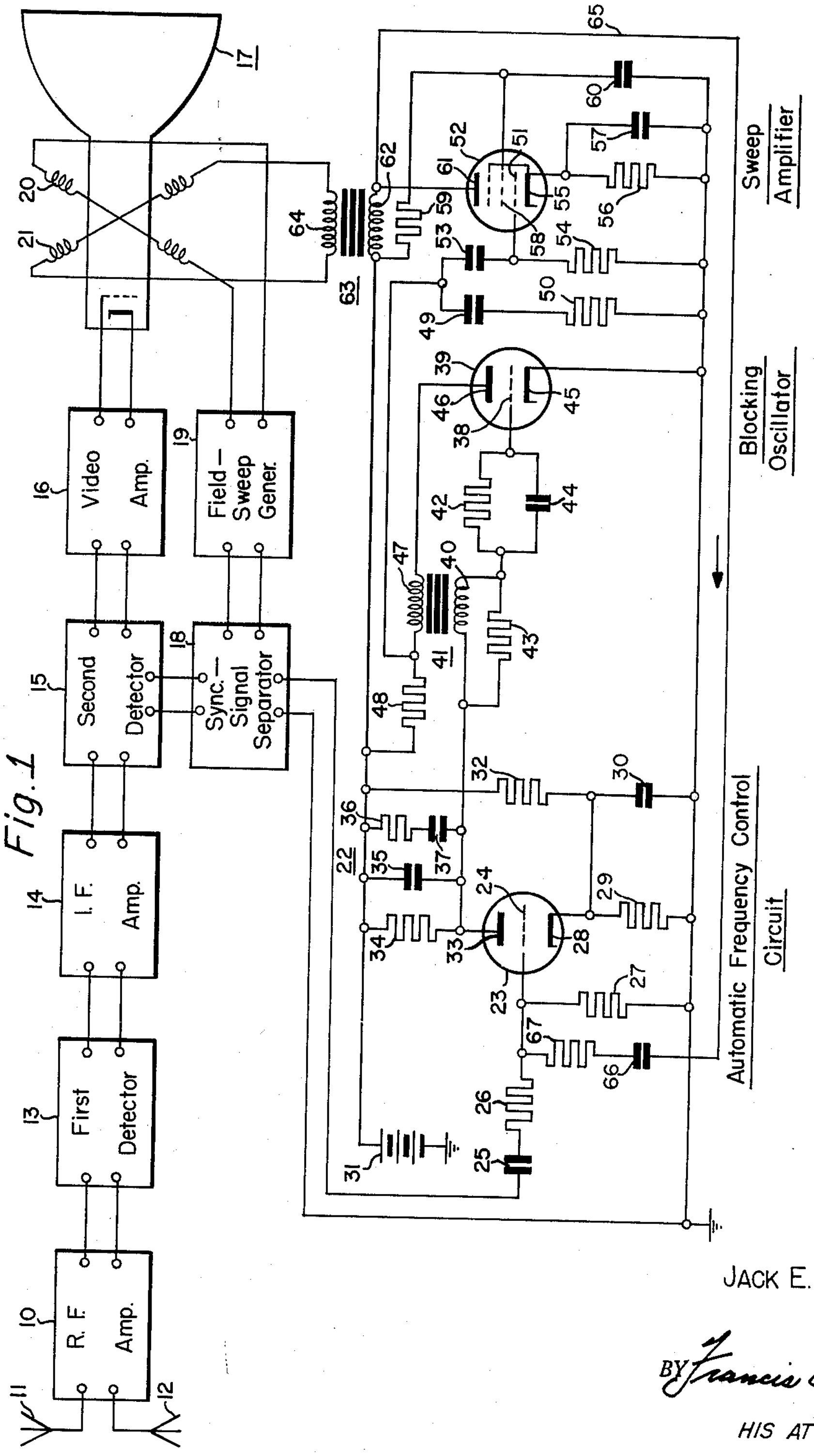

This invention relates to electrical networks for use in a television receiver or the like for controlling the deflection of the cathode-ray beam developed in the image-reproducing tube of such a receiver. More particularly, the invention is directed to an improved automatic frequency-control circuit for synchronizing the deflecting system of a television receiver with received synchronizing pulses.

It has been found in the television art that in order to provide satisfactory images at the receiver, extremely accurate synchronization must be maintained at all times between the line- and field-deflecting systems associated with the image-reproducing tube and the incoming synchronizing pulses. This is particularly necessary in the case of the line-deflection network. Noise disturbances and the like which may make their way to the synchronizing circuits may disturb the synchronous operation and, accordingly, may have an extremely detrimental effect on the reproduced image.

In order to overcome the deleterious effect of noise disturbances, synchronizing circuits have been provided in the past that exhibit some immunity to such disturbances. These prior-art circuits usually take the form of a phase detector, a suitable filter, and a direct-current amplifier arranged to supply a frequency-control potential to the scanning oscillator of the receiver, the output of which, in turn, is fed back to the phase detector and used in making the phase comparison from which the frequency-control potential is derived. The filter of this arrangement accomplishes an integrating function and requires a number of pulses recurring at a fixed repetition rate to have any material effect on the operating frequency of the scanning oscillator, and is relatively insensitive to noise pulses which do not recur at any regular rate.

It is an object of the present invention to provide an improved network of the automatic frequency control type for synchronizing the deflection network of a television receiver with incoming synchronizing pulses.

A further object of this invention is to provide an automatic frequency-control circuit that is highly stable in operation and which exhibits a high degree of immunity to noise disturbances and the like.

Yet another object of this invention is to provide an improved automatic frequency-control circuit that utilizes but a single electron-discharge device and is relatively simple and economical to construct.

Still another object of the invention is to provide an improved automatic frequency-control circuit that may utilize directly negative-polarity synchronizing pulses derived from the synchronizing-signal separator stage of the receiver, thereby obviating the need for an additional phase-inverter stage between the separator and the frequency-control circuit.

Figure 2:
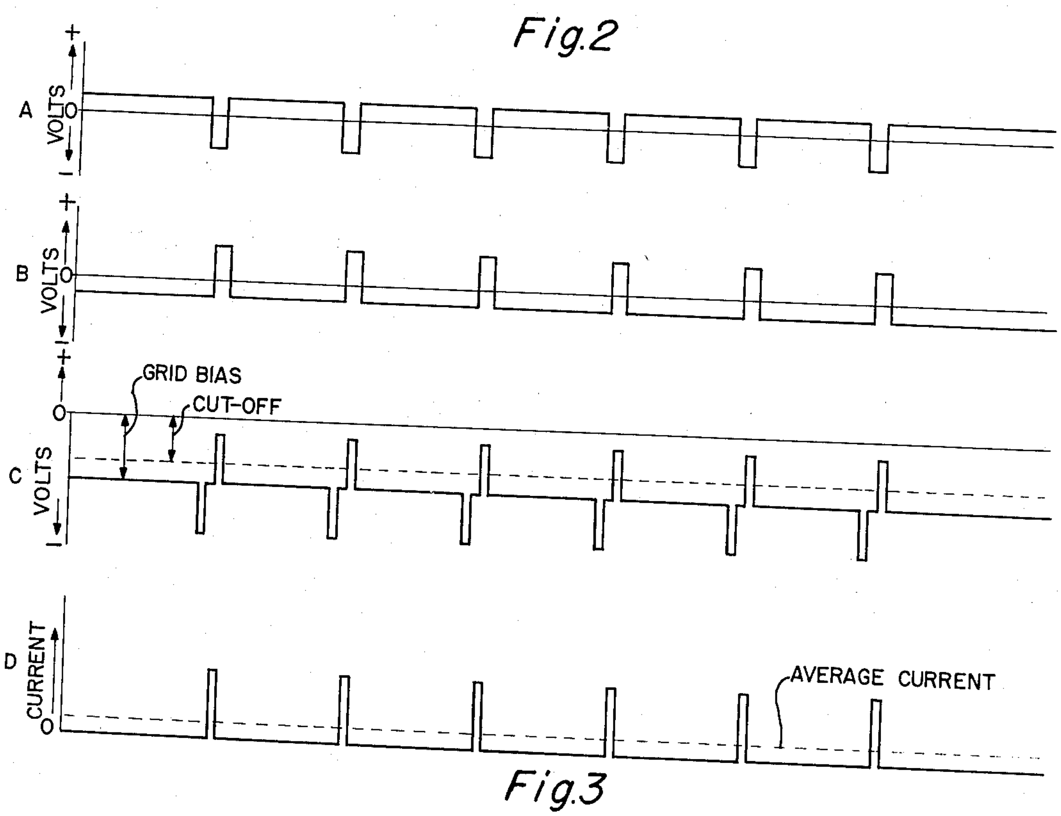
Figure 3:
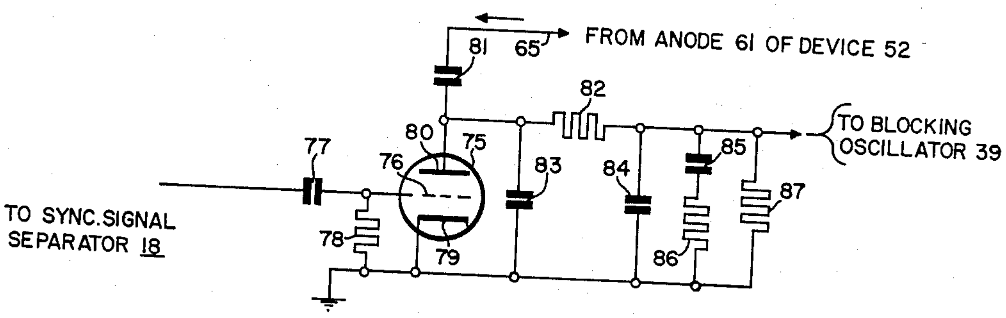

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a detailed diagram of the control circuit of the invention connected into a television receiver, Figure 2 represents various curves used in explaining the operation of the control circuit, and Figure 3 represents a preferred modification of the automatic frequency-control circuit of the invention.

The television receiver of Figure 1 includes a radio-frequency amplifier 10 of one or more stages, the input terminals of the amplifier being connected to a suitable antenna circuit 11, 12 and its output terminals to a first detector 13. First detector 13 is connected to an intermediate-frequency amplifier 14 of any desired number of stages, and the intermediate-frequency amplifier is connected to a second detector 15. Second detector 15 is connected through a video amplifier 16 of one or more stages to the input electrodes of an image-reproducing device 17.

Second detector 15 is further connected to a synchronizing-signal separator 18 which is coupled to a field-sweep generator 19. The output terminals of sweep generator 19 are connected to field-deflection elements 20 associated with image-reproducing device 17. Synchronizing-signal separator 18 is also connected to line-deflection elements 21 of device 17 through a line-deflection network indicated generally as 22, a portion of this latter network forming the present invention.

A television signal intercepted by antenna circuit 11, 12 is amplified in radio-frequency amplifier 10 and heterodyned to the selected intermediate frequency of the receiver in first detector 13. The intermediate-frequency signal is amplified in intermediate-frequency amplifier 14 and detected in second detector 15. The resulting composite video signal is amplified in video amplifier 16 and applied to the input terminals of reproducing device 17 to control the intensity of the cathode-ray beam developed therein in accordance with the picture intelligence.

The synchronizing-signal components of the received television signal are separated therefrom in synchronizing-signal separator 18, the field-synchronizing components being applied to field-sweep generator 19 to synchronize this generator and, therefore, the field deflection of the cathode-ray beam. The line-synchronizing components from separator 18 are used to synchronize line-deflection network 22 and, therefore, the line deflection of the cathode-ray beam in device 17 at the line frequency of the system. In this manner, an image representing the picture intelligence of the received television signal may be reproduced on the screen of reproducing device 17.

Deflection network 22 includes an electron-discharge device 23 connected, in accordance with the invention, to form an automatic frequency-control circuit. One of the output terminals of synchronizing-signal separator 18 is connected to ground and the other to control electrode 24 of device 23 through series-connected capacitor 25 and resistor 26, the control electrode being connected to ground through a grid-leak resistor 27. Cathode 28 of device 23 is connected to ground through a resistor 29 which is shunted by a capacitor 30, the cathode being further connected to the positive terminal of a source of unidirectional potential 31 through a biasing resistor 32. Anode 33 of device 23 is connected to potential source 31 through a load resistor 34 which is shunted by a capacitor 35 and by an integrating circuit comprising series-connected resistor 36 and capacitor 37.

Anode 33 is further connected to control electrode 38 of an electron-discharge device 39 through winding 40 of a transformer 41 and a grid-leak resistor 42, winding 40 being shunted by a resistor 43 and resistor 42 by a capacitor 44. Device 39 is connected in a well-known blocking-oscillator circuit, and has its cathode 45 directly connected to ground and its anode 46 connected to potential source 31 through winding 47 of transformer 41 and resistor 48. The junction of winding 47 and resistor 48 is connected to ground through a discharge capacitor 49 and series-connected resistor 50.

The junction of winding 47 and resistor 48 is coupled to a control electrode 51 of an electron-discharge device 52 through a coupling capacitor 53, the control electrode being connected to ground through a grid-leak resistor 54. Device 52 is an amplifier for the sweep signal developed by blocking oscillator 39, and has its cathode 55 connected to ground through a cathode resistor 56 shunted by a capacitor 57. Screen electrode 58 of device 52 is connected to unidirectional potential source 31 through a resistor 59 and is by-passed to ground through a capacitor 60. Anode 61 of device 52 is connected to potential source 31 through a primary winding 62 of an output transformer 63, secondary winding 64 of the output transformer being connected to the line-deflection elements 21 of device 17. Anode 61 is also connected to control electrode 24 of device 23 by way of a lead 65 and through a capacitor 66 and series-connected resistor 67.

Negative-polarity line-synchronizing pulses delivered to output terminals of synchronizing-signal separator 18 are impressed on the automatic frequency-control circuit wherein the synchronizing pulses are compared with derived comparison pulses, in a manner to be described, to produce a control potential having amplitude variations proportional to phase variations between the synchronizing pulses and the comparison pulses. The blocking-oscillator 39 is adjusted to have a free-running frequency substantially equal to the repetition frequency of the line-synchronizing pulses, and the control potential derived from the automatic frequency-control circuit adjusts the operating frequency of the blocking oscillator to establish and maintain synchronism with the synchronizing pulses. The output circuit of the blocking oscillator includes discharge capacitor 49 and series resistor 50 so that peaked saw-tooth waves are produced thereby, these waves being amplified by means of device 52. The circuit parameters are chosen so that the peaked saw-tooth waves have the proper wave form to cause a current flow in line-deflection winding 21 of saw-tooth wave form as required to effect linear deflection of the cathode-ray beam in device 17.

Blocking oscillator 39 and amplifier 52 may be considered to constitute a periodic-wave generator whose frequency is to be synchronized with the incoming synchronizing pulses. The output signal of the generator is fed back to control electrode 24 of device 23 through series-connected capacitor 66 and resistor 67, the time constant of network 66, 67 being so chosen that positive-polarity pulses having an individual duration short compared with the period of the generator are applied to control electrode 24. Preferably, the time constant of network 66, 67 is made such that the individual duration of the derived positive polarity pulses is the same as the duration of the synchronizing pulses supplied by separator 18.

Device 23 is normally biased to a non-conductive state by means of the potentiometer arrangement of resistors 29, 32. The derived comparison pulses supplied through network 66, 67 to control electrode 24 are shown in curve B of Figure 2 and have sufficient amplitude to overcome this bias and render device 23 conductive. The negative-polarity synchronizing pulses of curve A individually overlap the comparison pulses and have sufficient amplitude to return the device to its non-conductive state. The effect of the joint application of the synchronizing pulses and comparison pulses to control electrode 24 is shown in curve C, and the resulting pulses of anode current in device 23 are shown in curve D. The horizontal broken line of curve C represents the potential level of anode current cut-off in device 23 and only the voltage components contributed by the comparison pulses of curve B are able to exceed that level and cause the flow of plate current.

Examination of curves A, B and C reveals that any phase change between the pulses of curves A and B in effect gives rise to a width modulation of the pulse components of curve C that drive device 23 to its conductive state. This in turn, produces a width modulation of the current pulses flowing in the device. Network 36, 37 acts as a filter and amplitude variations in the potential thereacross correspond to variations in the average space current of device 23.

Any tendency for the frequency of blocking oscillator 39 to shift from the line frequency of the received signal is manifested by a change in phase between the incoming synchronizing pulses and the derived comparison pulses applied to control electrode 24 of device 23. This phase change causes a width variation in the space current pulses flowing in device 23 which, in turn, modifies the average value of space current and the amplitude of the control potential derived across the output network. Variations in amplitude of the control potential return the blocking oscillator to synchronous operation with the line-snychronizing components of the received signal in well-known manner.

Copending application Serial No. 94,642, filed May 21, 1949, of Walter S Druz and Erwin M. Rosche, entitled "Signal Slicing Circuit" and assigned to the present assignee, now Patent No. 2,656,414, issued October 20, 1953, discloses an improved type of synchronizing-signal separator which has gained wide commercial acceptance. This synchronizing-signal separator produces negative-polarity line-synchronizing pulses, and the automatic frequency-control circuit of this invention which utilizes negative-polarity synchronizing pulses may be directly connected to the above type of separator without the need for intervening phase-inverting stages.

The automatic frequency-control circuit has a high immunity to noise disturbances, since it requires many pulses recurring at a fixed frequency to have any effect on the average space current of device 23. Noise pulses occurring between the received synchronizing pulses and of comparable amplitude thereto have no appreciable effect because they are applied to control electrode 24 with negative polarity and occur when device 23 is cut-off. Similarly, noise pulses superposed on the synchronizing pulses have no effect on the conductivity of device 23 and do not adversely disturb the desired frequency control.

A preferred modification of the automatic frequency-control circuit is shown in Figure 3. This circuit includes an electron-discharge device 75 having a control electrode 76 coupled to synchronizing-signal separator 18 of Figure 1 through a capacitor 77 and connected to ground through a grid-leak resistor 78. Cathode 79 of device 75 is connected directly to ground, and anode 80 is coupled to anode 61 of device 52 (Figure 1) through a capacitor 81. The anode and cathode electrodes of device 75 are coupled to a network comprising a resistor 82 and capacitors 83, 84, the network being shunted by an integrating network comprising a capacitor 85 and a series-connected resistor 86, and by resistor 87. The junction of capacitor 85 and resistor 87 is connected to the lower end of resistor 43 of the blocking-oscillator circuit of device 39 (Figure 1).

In the circuit of Figure 3, the signal derived from amplifier 52 over lead 65 is applied to the anode of the automatic frequency-control device to preclude any possibility of these pulses being reflected back into the field-deflection network of the receiver. Network 81—87 acts to shape the signal on lead 65 as applied to anode 80 into positive-polarity pulses similar to those shown in curve B of Figure 2. As in the previous circuit, the derived comparison pulses and the negative-polarity synchronizing pulses produce width-modulated current pulses in device 75 in accordance with the phase relation between the synchronizing and comparison pulses. A control potential is derived across network 84—87 having amplitude variations proportional to variations in the average space current flowing in device 75, and this potential is used to control the frequency of blocking oscillator 39.

The invention provides, therefore, an improved automatic frequency-control circuit for synchronizing the frequency of a periodic-wave generator with incoming synchronizing pulses. The control circuit is extremely simple in construction and may comprise merely a simple triode and associated circuitry. The control circuit has proven highly suitable and reliable in operation and exhibits a high degree of immunity to noise disturbances and the like. Moreover, due to the fact that the circuit may utilize negative-polarity synchronizing pulses it may be directly coupled to any synchronizing-signal separator that delivers output pulses of negative polarity.

While particular embodiments of the invention have been shown and described modifications may be made and it is intended in the appended claims to cover all such modifications as may fall within the true spirit and scope of the invention.

I claim:

1. An automatic frequency-control circuit for synchronizing the frequency of a periodic-wave generator with incoming synchronizing pulses comprising: an electron-discharge device normally maintained in a non-conductive state; means for deriving pulses from said generator having an individual duration short compared with the period of said generator and for applying said derived pulses to said discharge device with a polarity and amplitude to render said device conductive; means for supplying said synchronizing pulses to said device with a polarity and amplitude to return said device to a non-conductive state for the portion of each of said synchronizing pulses occurring in time-coincidence with said derived pulses, thereby giving rise to current pulses in said device width-modulated in accordance with the phase relation of said synchronizing pulses and said derived pulses; an integrating output circuit for said device for producing a control potential having amplitude variations proportional to variations in the average space current flowing in said device; and means for applying said control potential to said periodic-wave generator to control the operating frequency thereof.

2. An automatic frequency-control circuit for synchronizing the frequency of a periodic-wave generator with incoming synchronizing pulses comprising: an electron-discharge device normally biased to a non-conductive state; means for deriving pulses from said generator each having a duration corresponding to the individual duration of said synchronizing pulses and for applying said derived pulses to said discharge device with a polarity and amplitude to overcome said bias and render said device conductive; means for supplying said synchronizing pulses to said device with a polarity and amplitude to return said device to a non-conductive state for the portion of each of said synchronizing pulses occurring in time-coincidence with said derived pulses, thereby giving rise to current pulses in said device width-modulated in accordance with the phase relation of said synchronizing pulses and said derived pulses; an integrating output circuit for said device for producing a control potential having amplitude variations proportional to variations in the average space current flowing in said device; and means for applying said control potential to said periodic-wave generator to control the operating frequency thereof.

3. An automatic frequency-control circuit for synchronizing the frequency of a periodic-wave generator with incoming negative-polarity synchronizing pulses comprising: an electron-discharge device normally biased to a non-conductive state; means for deriving positive-polarity pulses from said generator having an individual duration short compared with the period of said generator and for applying said derived pulses to said discharge device with sufficient amplitude to overcome said bias and render said device conductive; means for supplying said negative-polarity synchronizing pulses to said device with sufficient amplitude to return said device to a non-conductive state for the portion of each of said synchronizing pulses occurring in time-coincidence with said derived pulses, thereby giving rise to current pulses in said device width-modulated in accordance with the phase relation of said synchronizing pulses and said derived pulses; an integrating output circuit for said device for producing a control potential having amplitude variations proportional to variations in the average space current flowing in said device; and means for applying said control potential to said periodic-wave generator to control the operating frequency thereof.

4. An automatic frequency-control circuit for synchronizing the frequency of a periodic-wave generator with incoming negative-polarity synchronizing pulses comprising: an electron-discharge device having input electrodes and output electrodes, and normally biased to a non-conductive state; means for deriving positive-polarity pulses from said generator each having a duration corresponding to the individual duration of said synchronizing pulses and for applying said derived pulses to said input electrodes with sufficient amplitude to overcome said bias and render said device conductive; means for supplying said negative-polarity synchronizing pulses to said input electrodes with sufficient amplitude to return said device to a non-conductive state for the portion of each of said synchronizing pulses occurring in time-coincidence with said derived pulses, thereby giving rise to current pulses in said device width-modulated in accordance with the phase relation of said synchronizing pulses and said derived pulses; an integrating output circuit coupled to said output electrodes for producing a control potential having amplitude variations proportional to variations in the average space current flowing in said device; and means for applying said control potential to said periodic-wave generator to control the operating frequency thereof.

5. An automatic frequency-control circuit for synchronizing the frequency of a periodic-wave generator with incoming negative-polarity synchronizing pulses comprising: an electron-discharge device having a control electrode, a cathode and an anode, and normally biased to a non-conductive state; means for deriving positive-polarity pulses from said generator each having a duration corresponding to the individual duration of said synchronizing pulses and for applying said derived pulses between said control electrode and cathode with sufficient amplitude to overcome said bias and render said device conductive; means for applying said negative-polarity synchronizing pulses between said control electrode and cathode with sufficient amplitude to return said device to a non-conductive state for the portion of each of said synchronizing pulses occurring in time-coincidence with said derived pulses, thereby giving rise to current pulses in said device width-modulated in accordance with the phase relation of said synchronizing pulses and said derived pulses; an integrating output circuit coupled between said anode and said cathode for producing a control potential having amplitude variations proportional to variations in the average space current flowing in said device; and means for applying said control potential to said periodic-wave generator to control the operating frequency thereof.

6. An automatic frequency-control circuit for synchronizing the frequency of a periodic-wave generator with incoming negative-polarity synchronizing pulses comprising: an electron-discharge device having a control electrode, a cathode and an anode, and normally maintained in a non-conductive state; means for deriving positive-polarity pulses from said generator each having a duration corresponding to the individual duration of said synchronizing pulses and for applying said derived pulses between said anode and cathode with sufficient amplitude to render said device conductive; means for applying said negative-polarity synchronizing pulses between said control electrode and cathode with sufficient amplitude to return said device to a non-conductive state for the portion of each of said synchronizing pulses occurring in time-coincidence with said derived pulses, thereby giving rise to current pulses in said device width-modulated in accordance with the phase relation of said synchronizing pulses and said derived pulses; an integrating output circuit coupled between said anode and said cathode for producing a control potential having amplitude variations proportional to variations in the average space current flowing in said device; and means for applying said control potential to said periodic-wave generator to control the operating frequency thereof.

References Cited in the file of this patent

UNITED STATES PATENTS

| | | |
|---|---|---|
| 2,339,536 | Wendt | Jan. 18, 1944 |
| 2,463,685 | Frendendall et al. | Mar. 8, 1944 |
| 2,503,700 | Barco | Apr. 11, 1950 |
| 2,540,820 | Gruen | Feb. 6, 1951 |
| 2,574,482 | Hugenholtz | Nov. 13, 1951 |
| 2,585,930 | Gruen | Feb. 19, 1952 |
| 2,617,040 | Bailey | Nov. 4, 1952 |